Figure 1:
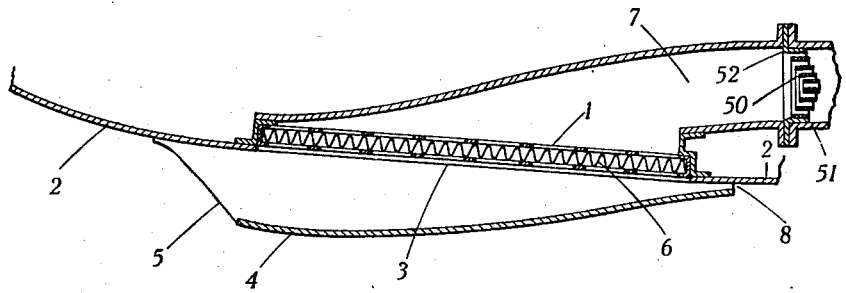

May 25, 1943.　　　C. G. VOKES　　　2,319,894

FILTER

Original Filed Nov. 2, 1937

Inventor

CECIL G. VOKES, by

Attorney

Patented May 25, 1943

2,319,894

UNITED STATES PATENT OFFICE 2,319,894

FILTER

Cecil Gordon Vokes, London, England

Original application November 2, 1937, Serial No. 172,455. Divided and this application December 12, 1939, Serial No. 308,847. In Great Britain May 7, 1937

2 Claims. (Cl. 244—1)

The invention relates to filters and to the installation of air-filtering means in aircraft.

It is an object of the invention to provide an improved form of filter comprising a pleated filter element secured within a casing.

It is also an object of the invention to provide an air-cleaning installation for aircraft comprising a filter element and means to supply air to an engine of the aircraft by way of the filter element at a pressure dependent upon the speed of the aircraft.

It is a further object of the invention to provide an air-cleaning installation for aircraft comprising a filter element arranged within a part of the aircraft and a scoop or the like with a forwardly facing opening arranged outside the aircraft to collect air and pass it to the filter element.

It is still further an object to provide, in an air-cleaning installation as just described, means for dealing with rain and other foreign matter entering the scoop.

With the above and other objects in view, the invention consists in the improved combinations and arrangements contained in the embodiments now to be described in detail, and features of which are set out in the claims which follow.

Figure 2:
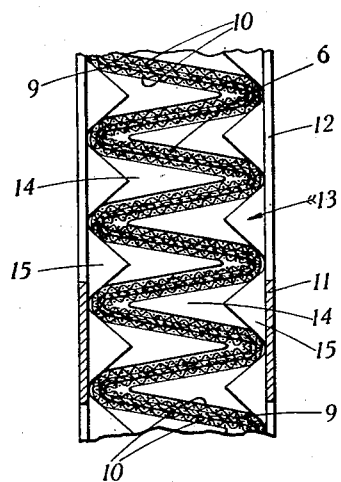
Figure 3:
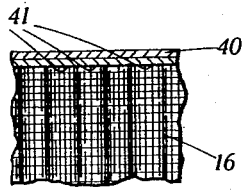
Figure 4:
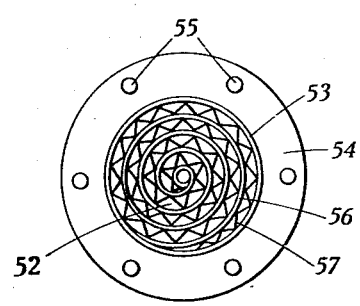

In the drawing:

Figure 1 is a sectional side elevation of an air filter installation for an in-line air cooled engine or a liquid cooled engine mounted within the fuselage of an aeroplane, or within a streamlined nacelle or other part of an aircraft, Figure 2 is a section through part of a filter panel in accordance with the invention, Figure 3 is a view, partly in section, of a detail of the filter panel shown in Fig. 2, and Figure 4 is a detached view, to an enlarged scale, of a detail of Fig. 1.

In the installation illustrated by Figure 1, a filter panel 1 is mounted within the fuselage or nacelle, the skin of which is indicated at 2, so as to register with a hole 3 in the bottom thereof, through which it may be inserted and removed.

The hole 3 is covered by a casing in the form of a scoop 4, which has a relatively wide opening 5 at the front, considered in the direction of motion of the aircraft, through which air may enter to pass through the filter element 6 of the filter unit to a passage 7 connected to the air intake of the carburettor or carburettors of the engine.

A relatively small opening 8 is provided at the rear of the scoop 4, by way of which rain, snow and the larger solid particles, such as sand, entering the scoop may escape.

The use of the forwardly opening scoop 4 not only ensures that air is collected from outside the stagnant boundary layer and delivered to the filter unit, for passage to the air intake, but also that this air is delivered at a pressure dependent upon the speed of the aircraft, thus giving a super-charging effect.

The filter panel is illustrated in Fig. 2 and comprises a filter element 6 enclosed within a casing of fibre-board, cardboard or the like.

The filter element 6, which comprises a layer 9 of filter material, such as cellulose wadding, between two layers 10, 10 of buckram or other gauze, is folded to form a number of V-shaped pockets or pleats which are of considerable length in relation to the rigidity of the element.

The casing of the panel is formed from sheets of fibre-board or the like cut, bent and secured together to form a box-like structure having channel-like edge members connected by horizontal and vertical spacing portions which provide a number of substantially rectangular openings in the opposite faces of the structure. In Fig. 2 spacing portions, one in section and the other in elevation, appear at 11 and 12, whilst one of the openings just referred to is indicated at 13.

The correct shape and spacing of the pleats in the filter element 6 are maintained by tongues 14 bent from the edges of strips of fibre-board which are carried by spacing portions of the box-like structure. These tongues are reinforced at their bases by triangular tongues 15 which are bent from the edges of metal strips which are interposed between the fibre-board strips and the associated spacing portions. Small tongues (not shown) bent up from the opposite faces of the metal strips are pressed through the fibre-board strips and the spacing portions of the box-like structure respectively, and bent oved, the various strips (fibre-board and metal) being thereby secured to the associated spacing portions of the box-like structure.

The tongued fibre-board strips are secured to the inner faces of the spacing portions on both sides of the structure, so that adjacent pockets in the filter element are entered by spacing tongues from opposite sides of the structure.

At the edges of the panel, the pleated filter element 6 is secured to the channel-like members by means of adhesive. Thus, as indicated in Figure 3, the ends of the element are secured to the cardboard end members 40 by means of adhesive applied as at 41.

The filter panel can be of any convenient shape, as to the figure defined by the channel-like edge members, and can thus be so shaped as to correspond to the outline of the fuselage or of the space in which it is housed or shaped to avoid adjacent structural members or accessories.

The filter panel just described is very light, but has yet the requisite rigidity. The pleating of the filter element gives a very large filter area in relation to the bulk of the panel.

If required, the panel can be easily removed and replaced by a new panel or it can be easily cleaned, for example by means of a high-suction vacuum cleaner the nozzle of which is applied in turn to the substantially rectangular openings formed by the spacing portions of the box-like structure.

Although, in Fig. 1, the pleats of the filter element 6 are represented as running laterally of the aircraft, they might instead run in the fore and aft direction. In general, they will run in the direction of the largest dimension of the panel but, whenever possible, it is preferred that they should run vertically to make the filter to some extent self-cleaning in that foreign matter shaken from the element by vibration falls to the bottom. Thus, where instead of installing a single panel in the bottom of the fuselage or nacelle as in Fig. 1, a panel is arranged at each side of the fuselage or nacelle, the pleats of the filter elements will be arranged vertically or perhaps inclined both to the horizontal and the vertical.

Instead of passing directly to the carburettor intake as described, the air delivered to the filter panel by the scoop 4 may pass through the filter element into the space within the fuselage or other part of the aircraft in which the engine is housed, all ways of access for air to the space being provided with filtering means, so that the engine can suck in none other than filtered air. Thus, the passage 7 may deliver into the space in which the engine is housed, or it may be omitted altogether.

It will be seen that the swiftly moving air delivered to the filters strikes the filter panels obliquely and has to change direction within the scoop 4 to pass through the filter panel and has then again to change direction to flow along the passage 7. The changes of direction thus imposed upon the air stream are liable to set up eddy currents which may interfere with the correct functioning of the carburettor or carburettors and the distribution of the fuel-air mixture to the various cylinders of the engine.

Installations in accordance with the invention include means for straightening the flow of air which has passed through the filtering means.

As shown in Figure 1, an air flow straightening device 50, which may have the form illustrated by Figure 4, is arranged at the junction between the intake pipe 51 of the carburettor or carburettors and the passage 7 of the installation.

The example of an air-straightening device shown by Figure 4 comprises a member 52 having a cylindrical portion 53, which fits within the intake pipe 51, and a flange 54 which is adapted to be gripped between the flanges of the passage 7 and of the pipe 51 and has holes 55 for the passage of fixing studs.

The air-straightening means is carried by the cylindrical portion 53 and comprises a spirally wound flat strip 56 between the convolutions of which a sinuous or zig-zag strip 57 is wound to form a plurality of small passages which serve to break up the air flow into a number of streams of relatively small cross-section flowing parallel to the axis of the cylindrical portion 53 and thus to render the air flow homogeneous.

This application is a division of my application, Serial No. 172,455 filed November 2, 1937 (now issued as Patent No. 2,198,190 dated April 23, 1940).

I claim:

1. In an aircraft having an outer surface skin with an opening therein, means for furnishing filtered air for use by utilities within the aircraft, comprising an air scoop secured at its sides to the skin of the aircraft at opposite sides of said opening and spaced from said opening and the skin of the aircraft in a general fore and aft direction of the craft to provide a relatively large inlet for air in a direction facing forwardly of the aircraft and converging to a relatively small opening between the skin and the scoop to the rear thereof, an air filter interposed in the opening in the skin, and means to convey filtered air from said filter to said utilities.

2. In an aircraft having an engine and formed in an exterior wall with an elongated opening, an air scoop including a wall section overlying and spaced from the opening in the aircraft wall, said air scoop wall converging relative to the aircraft wall and defining an air inlet at its larger end and a restricted outlet at its smaller end, the inlet end of the air scoop being open to the admission of air under a pressure incident to the travel of the aircraft, and a filter arranged in the opening in the wall of the aircraft and open at one side to the air entering the air scoop and delivering filtered air from the opposite side for use by the engine, the relation of the filter and air scoop causing the air to be delivered through the filter to be at a pressure less than that of the air passing through the scoop, the filter being so constructed that its effective filter length is materially greater than the length of the filter-receiving opening in the wall of the aircraft.

CECIL GORDON VOKES.